(12) United States Patent  
Schindzielorz et al.

(10) Patent No.: US 8,109,534 B2  
(45) Date of Patent: Feb. 7, 2012

(54) HIGHLY THERMAL RESISTANT MATERIAL FOR A VEHICLE SAFETY DEVICE

(75) Inventors: Michael Schindzielorz, Kernersville, NC (US); Edward Thomas Sescourka, Jr., Greensboro, NC (US)

(73) Assignee: Highland Industries, Inc., Kernersville, NC (US)

( * ) Notice: Subject to any disclaimer, the term of this patent is extended or adjusted under 35 U.S.C. 154(b) by 66 days.

(21) Appl. No.: 12/507,458

(22) Filed: Jul. 22, 2009

(65) Prior Publication Data

US 2011/0018244 A1    Jan. 27, 2011

(51) Int. Cl.
- *B60R 21/231* (2011.01)
- *B32B 5/02* (2006.01)
- *B32B 27/18* (2006.01)

(52) U.S. Cl. ............ 280/743.1; 280/729; 280/740; 428/36.1; 442/76; 442/164; 442/203; 442/218

(58) Field of Classification Search .......... 53/116, 53/117, 429, 459; 139/384 R–387 R; 280/728.1, 280/729, 731, 740, 742, 743.1; 383/3; 428/34.3, 428/34.5, 34.6, 34.7, 36.1, 36.91; 442/76, 442/152, 158, 164, 203, 218
See application file for complete search history.

(56) References Cited

U.S. PATENT DOCUMENTS

| | | | |
|---|---|---|---|
| 3,807,754 A * | 4/1974 | Rodenbach et al. | 280/743.1 |
| 4,921,735 A * | 5/1990 | Bloch | 428/34.9 |
| 5,010,663 A * | 4/1991 | Thornton et al. | 38/52 |
| 5,110,666 A * | 5/1992 | Menzel et al. | 428/196 |
| 5,208,097 A * | 5/1993 | Honma et al. | 442/164 |
| 5,226,671 A * | 7/1993 | Hill | 280/743.1 |
| 5,249,824 A * | 10/1993 | Swann et al. | 280/729 |
| 5,296,278 A * | 3/1994 | Nishimura et al. | 428/36.1 |
| 5,298,317 A * | 3/1994 | Takahashi et al. | 442/85 |
| 5,470,106 A * | 11/1995 | Nishimura et al. | 280/743.1 |
| 5,494,314 A * | 2/1996 | Kriska et al. | 280/740 |
| 5,516,146 A * | 5/1996 | Kopitzke | 280/728.2 |
| 5,520,415 A * | 5/1996 | Lewis et al. | 280/743.1 |
| 5,573,270 A * | 11/1996 | Sogi et al. | 280/740 |
| 5,573,619 A * | 11/1996 | Benedict et al. | 156/137 |
| 5,650,207 A | 7/1997 | Crouch | 428/36.1 |
| 5,658,674 A * | 8/1997 | Lorenzetti et al. | 428/447 |
| 5,705,445 A * | 1/1998 | Chikaraishi et al. | 442/104 |
| 5,746,446 A * | 5/1998 | Breed et al. | 280/743.1 |
| 5,874,000 A | 2/1999 | Herding | 210/490 |
| 5,877,256 A * | 3/1999 | Nakamura et al. | 524/765 |
| 5,881,776 A * | 3/1999 | Beasley, Jr. | 139/389 |
| 5,928,721 A * | 7/1999 | Parker et al. | 427/197 |
| 5,945,184 A * | 8/1999 | Nagata et al. | 428/35.2 |

(Continued)

FOREIGN PATENT DOCUMENTS

JP        06033336 A  *  2/1994

*Primary Examiner* — Paul N Dickson  
*Assistant Examiner* — Laura Freedman  
(74) *Attorney, Agent, or Firm* — MacCord Mason PLLC

(57) ABSTRACT

An airbag. The airbag includes a heat shield made of a thermal resistant material that prevents a pyrotechnic inflator's clinkers and hot gas from damaging the airbag or injuring the vehicle occupant. The thermal resistant material is a base fabric web with an elastomeric coating that includes a high aspect ratio additive such as vitreous fibers of alumina silicates. The resulting thermal resistant material exhibits exceptionally good thermal resistance times while, at the same time, uses relatively low coating weights.

34 Claims, 13 Drawing Sheets

U.S. PATENT DOCUMENTS

| | | | |
|---|---|---|---|
| 5,945,186 A * | 8/1999 | Li et al. ............... | 428/36.1 |
| 5,998,536 A * | 12/1999 | Bertry et al. ............ | 524/557 |
| 6,023,824 A * | 2/2000 | Fischer et al. ........... | 28/240 |
| 6,140,414 A * | 10/2000 | Ohsawa et al. ........... | 524/838 |
| 6,177,365 B1 * | 1/2001 | Li ............................ | 442/71 |
| 6,200,915 B1 * | 3/2001 | Adams et al. ............ | 442/157 |
| 6,239,046 B1 * | 5/2001 | Veiga et al. .............. | 442/76 |
| 6,268,300 B1 * | 7/2001 | Hernandez et al. ...... | 442/168 |
| 6,348,543 B1 * | 2/2002 | Parker ...................... | 525/106 |
| 6,354,620 B1 * | 3/2002 | Budden et al. ........... | 280/728.1 |
| 6,420,037 B1 * | 7/2002 | Tsuji et al. ............... | 428/447 |
| 6,425,600 B1 * | 7/2002 | Fujiki et al. .............. | 280/728.1 |
| 6,444,596 B1 * | 9/2002 | Hirai et al. ............... | 442/286 |
| 6,455,449 B1 * | 9/2002 | Veiga et al. .............. | 442/218 |
| 6,511,754 B1 * | 1/2003 | Bohin et al. .............. | 428/447 |
| 6,562,180 B1 * | 5/2003 | Bohin et al. .............. | 156/329 |
| 6,601,614 B1 * | 8/2003 | Ishii .......................... | 139/389 |
| 6,607,796 B1 * | 8/2003 | Hirai ......................... | 428/35.2 |
| 6,641,686 B1 * | 11/2003 | Veiga et al. .............. | 156/73.1 |
| 6,776,434 B2 * | 8/2004 | Ford et al. ................ | 280/729 |
| 6,905,985 B1 | 6/2005 | Schindzielorz ........... | 442/65 |
| 6,926,303 B2 * | 8/2005 | Fischer et al. ............ | 280/729 |
| 7,179,762 B1 * | 2/2007 | Beasley, Jr. .............. | 442/203 |
| 7,398,992 B2 | 7/2008 | Marriott ................... | 280/729 |
| 7,468,334 B2 | 12/2008 | Schindzielorz ........... | 442/164 |
| 7,481,453 B2 * | 1/2009 | Breed ....................... | 280/738 |
| 7,553,781 B2 | 6/2009 | Smith et al. .............. | 442/117 |
| 7,618,060 B2 * | 11/2009 | Harvey et al. ............ | 280/740 |
| 2002/0020992 A1 * | 2/2002 | Kanuma ................... | 280/730.2 |
| 2002/0122908 A1 * | 9/2002 | Li et al. .................... | 428/36.2 |
| 2004/0256842 A1 * | 12/2004 | Breed ....................... | 280/730.1 |
| 2005/0170723 A1 * | 8/2005 | Okada ....................... | 442/189 |
| 2006/0073750 A1 * | 4/2006 | Schindzielorz ........... | 442/59 |
| 2006/0273565 A1 * | 12/2006 | Britz ......................... | 280/743.1 |

* cited by examiner

HIGHLY THERMAL RESISTANT MATERIAL FOR A VEHICLE SAFETY DEVICE

BACKGROUND (1) Field

The present invention relates generally to vehicle airbags and, more particularly, to a coating that imparts high thermal resistance to an airbag's heat shield.

(2) Related Art

Airbags are used in the automotive industry to protect vehicle occupants in the event of an accident. An airbag system typically includes a sensor, inflator, airbag and cover. When the sensor is set off, for example in the event of an accident, the inflator is activated, and fills the airbag with gas. The airbag comes from behind (or through) the cover when inflated, thereby placing a cushion between the occupant and the potentially harmful vehicle surface. These events must occur within milliseconds to effectively protect the occupant.

Inflators are generally classified as cold-gas types, which release compressed gas, or pyrotechnic types, which burn a generant such as sodium azide or alkali metal azide. Combustion types are desirable because the generants' burn rates are controllable and reproducible, and therefore the devices are quite reliable. Combustion types also tend to be smaller, weigh less and be less expensive than compressed gas inflators.

Combustion inflators propel not only hot gas but also "clinkers," which are by-product particulates such as sulfur metals and sodium azide. These clinkers are propelled at approximately 90 meters per second, at 450-1000° C. These projectiles can burn holes in the airbag, which is typically made of nylon or a similar fabric, and can lead to decreased airbag efficacy or burn injuries to the occupant. So called "filtered combustion inflators" attempt to prevent clinker-related problems by introducing a filter into the gas stream which inhibits clinkers from entering the airbag itself. However, filters are an imperfect solution given they slow the inflation rate, introduce another part into the system that could lead to failure, add weight and volume to the system, and cost more.

"Unfiltered combustion inflators" or "hot unfiltered inflators" are very desirable in the industry because they are reliable, small, light and relatively inexpensive. However, since they do not have filters, the clinkers spew out of the inflator with the inflating gas. Hot clinkers can compromise the integrity of an airbag by melting or burning through the airbag material, thereby causing under inflation or premature deflation.

Accordingly, various treatments and devices have been tried to lessen the negative impact of clinkers in airbags used with hot unfiltered inflators. Specifically, airbags have been treated with inside coatings of heat resistant material such as neoprene, silicone resin, silicone rubber, fluororesin such as PFA, various poly-resins, expanded graphite and intumescent material. Alternatively, liners have been employed using materials such as aluminized silica cloth and expandable fiberglass. Also, independent heat shields have been introduced made of materials such as stamped steel, aromatic polyamide fiber such as Kevlar®, as well as nylon, polyester and fiberglass coated with neoprene, silicone or poly-vinyl chloride. Finally, deflectors have also been made of the same material as the airbag.

While the aforementioned improvements are useful, they remain less than ideal. Specifically, airbags with a treated inside surface are still susceptible to burn-through by projectile clinkers because known coatings provide limited protection when applied thinly but a thickly applied coating defeats the safety system's overall goal of being lightweight and occupying a small volume. Liners are also problematic because they introduce more bulk and weight to the airbag. The independent shields and deflectors are likewise limited in that they are either unacceptably bulky or not bulky but provide only limited protection.

Thus, there remains a need for a new and improved vehicle safety device, airbag, heat shield and coating that exhibit improved thermal resistance values while, at the same time, is both low volume and low weight.

SUMMARY OF THE INVENTIONS

The present inventions are directed to a vehicle safety device with significantly improved thermal resistance, yet is economical, efficacious, low volume and low weight. In use, the inventions protect the airbag and vehicle occupant from clinkers.

This is accomplished by providing a vehicle safety device including an airbag and heat shield, with the heat shield having a thermal resistance value of greater than 120 seconds at 450° C., when using a coating weight less than other known coatings.

Another aspect of the inventions is to provide a heat shield for an air bag including a base fabric web with a coating that includes a high aspect ratio thermally resistant additive.

Yet another aspect of the inventions is to provide an airbag including a heat shield, with the heat shield having a base fabric web and a coating, with the coating including a high aspect ratio thermally resistant additive that imparts onto the heat shield a thermal resistance value of greater than 120 seconds at 450° C. and including an inflator in communication with the airbag and heat shield.

Still another aspect of the inventions is to provide a method of producing a thermally resistant material wherein a high aspect ratio additive is added to both Component A and Component B, then Component A and Component B are combined to make a coating, which is applied to a base fabric web.

These and other functions of the present inventions will become apparent to those skilled in the art after a reading of the following description of the preferred embodiment when considered with the drawings.

DESCRIPTION OF THE PREFERRED EMBODIMENTS

Figure 1:
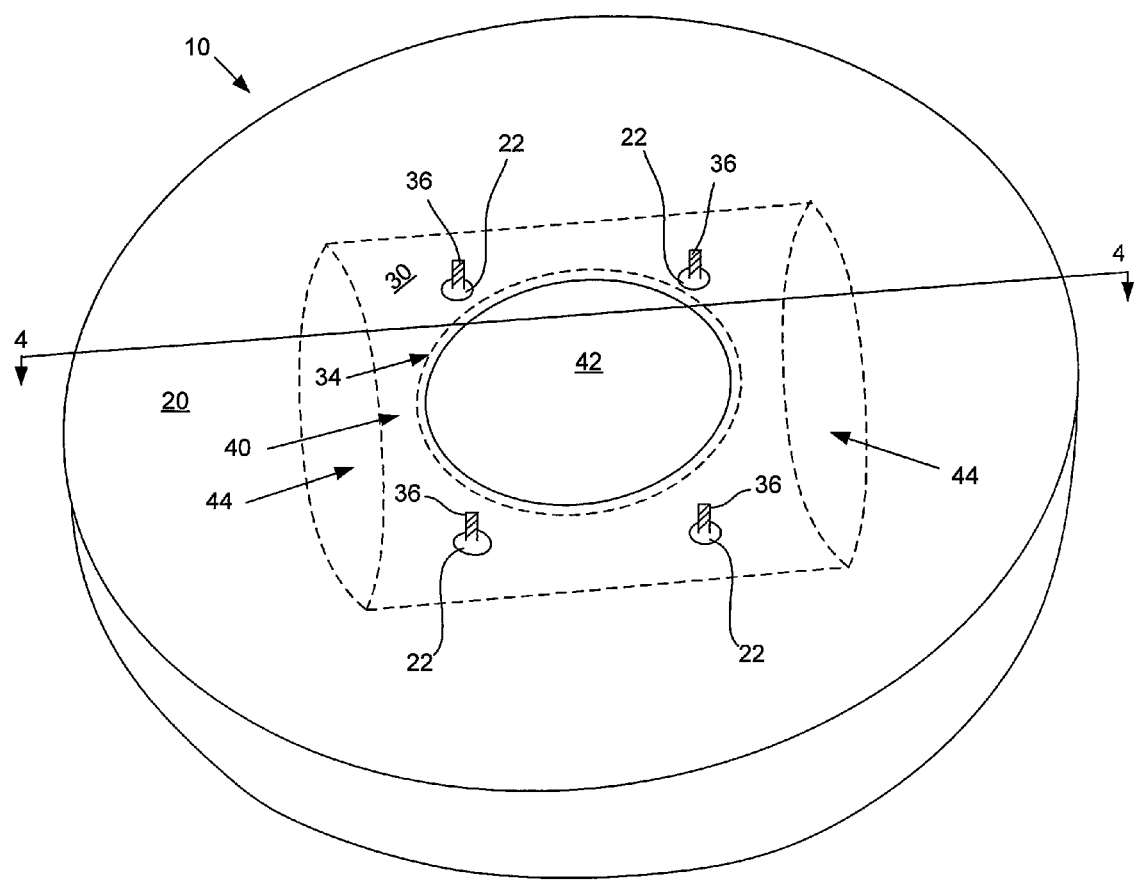
FIG. 1 depicts a top perspective view of a heat shield inside an airbag constructed according to the present inventions.

In the following description, like reference characters designate like or corresponding parts throughout the several views.

Referring now to the drawings, it will be understood that the illustrations are for the purpose of describing a preferred embodiment of the inventions and are not intended to limit the inventions thereto. The major components of vehicle safety device 10 are shown in FIG. 1, and include airbag 20, heat shield 30 (shown in phantom lines) and attachment plate 34 (shown in phantom). Vehicle safety device 10 protects vehicle passengers by providing a cushioning airbag 20, which is inflated through inlet 42. Heat shield 30 protects airbag 20 by deflecting gas 60 and clinkers (particulates) 61 coming from inflator 15.

Figure 2:
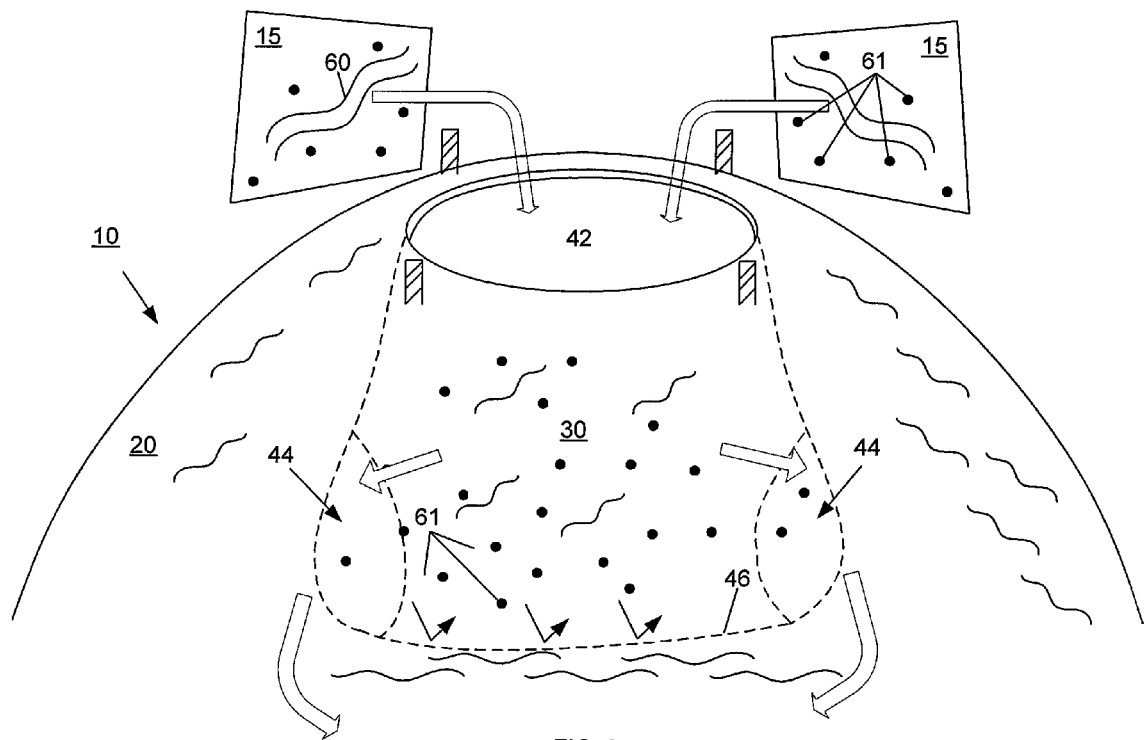
FIG. 2 schematically represents the path of air and clinkers from an inflator to an airbag and heat shield, shown in perspective.

FIG. 2 schematically represents the journey of gas 60 and clinkers 61 from inflator 15 into vehicle safety device 10. Specifically, gas 60 and clinkers 61 are expelled from inflator 15, pass through inlet 42, and enter heat shield 30. Gas 60 travels through ducts 44 to inflate airbag 20. Inflator 15 is in fluid communication with inlet 42, heat shield 30, and airbag 20.

Figure 3:
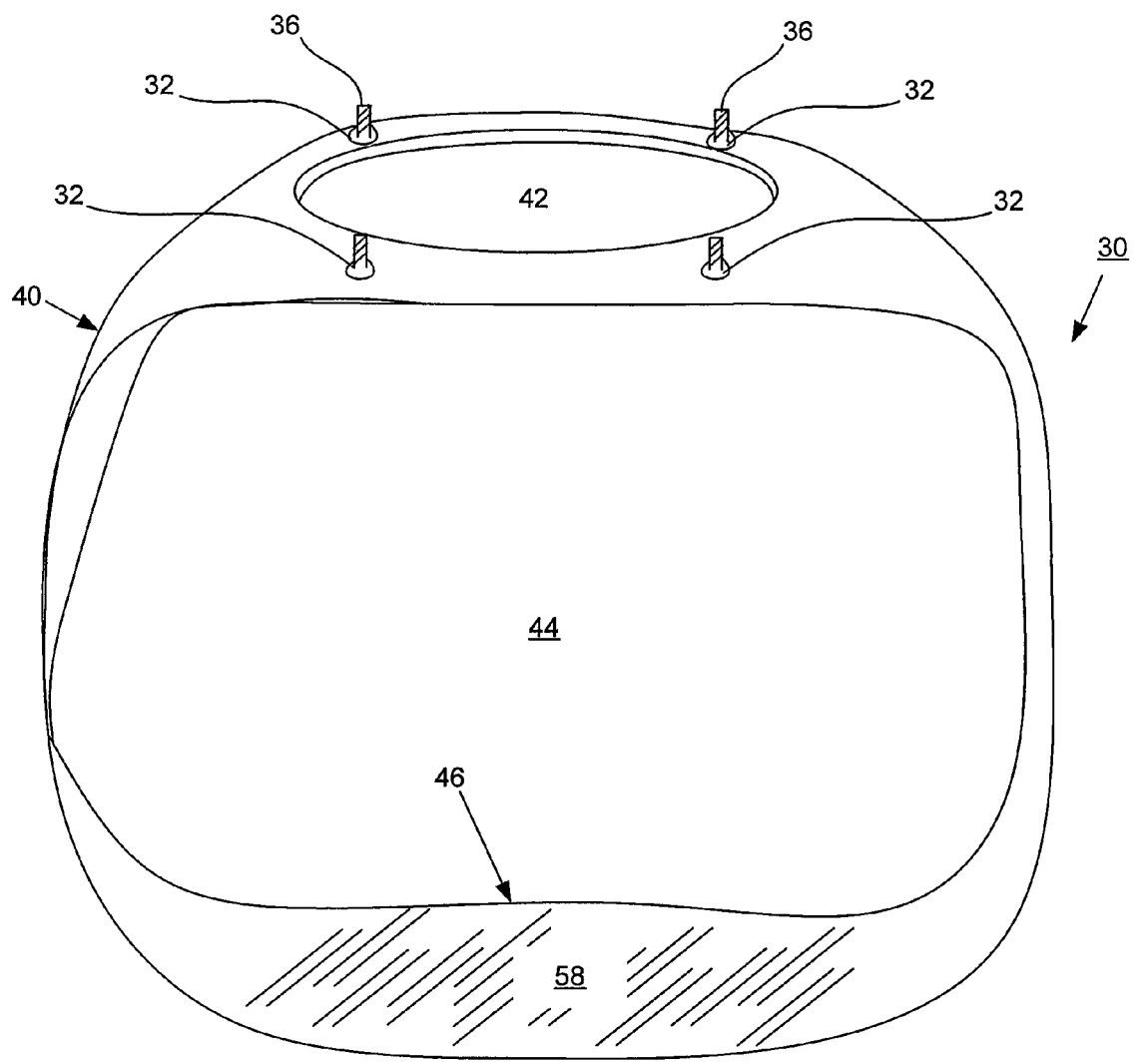
FIG. 3 is perspective side view of a heat shield with a connected attachment plate.

FIG. 3 further depicts heat shield 30, which defines inlet 42, through which gas 60 and clinkers 61 enter, and ducts 44, through which gas 60 exits. Upon inflation, clinkers 61 are substantially retained within heat shield 30, with a substantial number of clinkers 61 bouncing off deflecting surface 46, which includes coating 58, and coming to rest within heat shield 30. Even when clinkers 61 do not come to rest within heat shield 30, they are delayed in reaching airbag 20, and therefore are cooler when they arrive. This orientation lessens the risk that clinkers 61 or hot gas 60 will damage airbag 20 or injure occupant.

Figure 4:
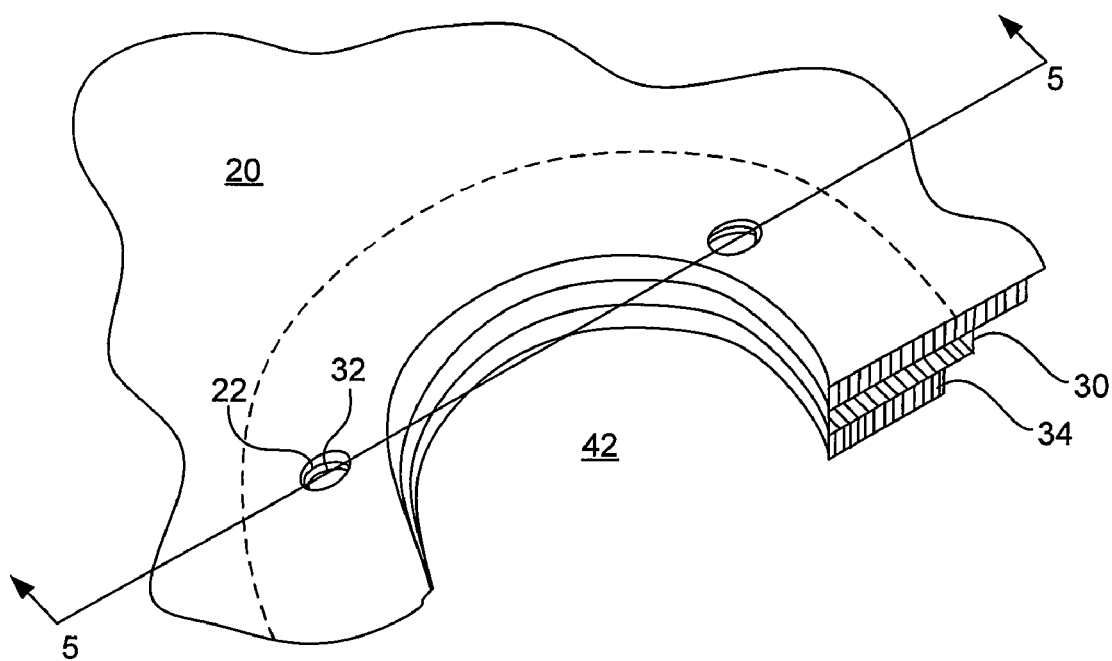
FIG. 4 is a cross sectional perspective view taken along lines 4-4 of FIG. 1 showing orientation of an airbag, heat shield and attachment plate.

FIG. 4 shows the orientation of layers with airbag 20 on top, heat shield 30 underneath, and attachment plate 34 underneath that. These three layers individually and collectively define inlet 42.

Figure 5:
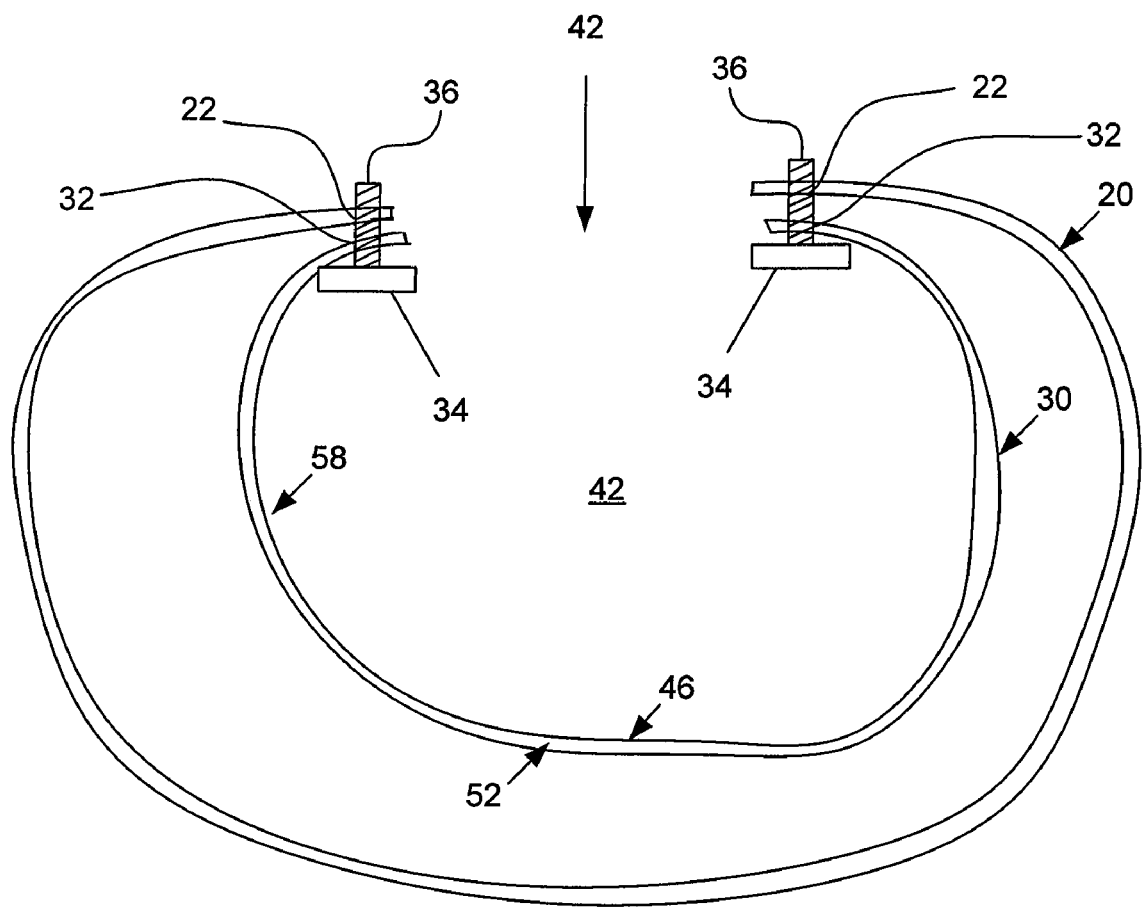
FIG. 5 is a cross sectional view generally taken along lines 5-5 of FIG. 4, except showing an entire cross section of an airbag and heat shield.

As best shown in FIG. 5, airbag 20 and heat shield 30 are preferably separate pieces, with heat shield 30 fitting within airbag 20 and connecting to each other by attachment plate 34. Preferably, attachment plate 34 includes fasteners 36, which protrude through shield fastener openings 32 and bag fastener openings 22 for connecting air bag 20 and heat shield 30.

Figure 6:
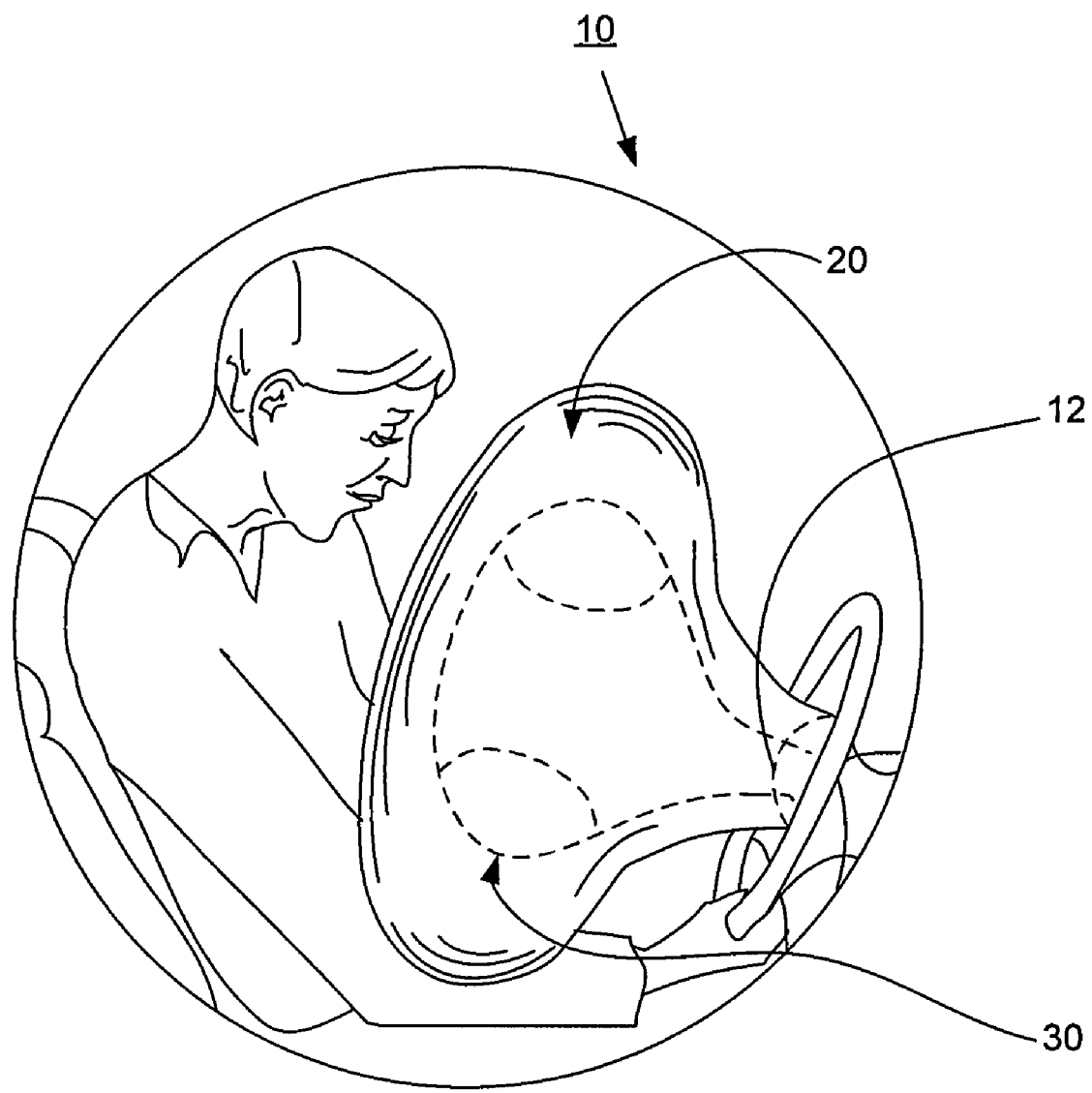
FIG. 6 is a depiction of a vehicle safety device in use.

In the event of an accident, inflator 15 is activated and combustion occurs. As shown in FIG. 6, inflated airbag 20 "breaks through" cover 12. Airbag 20 integrity is maintained because heat shield 30 has effectively protected it.

Heat shield 30 has a thermal resistance value of greater than 120 seconds at 450° C. Thermal resistance value, also known as the "burn-through rate" or "thermal resistivity" is the time it takes for a slug at a given temperature to burn through a given material. Thermal resistance values reported herein were determined using the "Hot Rod Thermal Resistance Tester." Specifically, a type 304 stainless the cylindrical rod (the "penetrator") with a diameter and length of ½ and 2 inches respectively is heated to a given temperature, typically 450, 550, 650 and 750° C.

In one test, a heated penetrator is positioned 5.25 inches above a test sample of fabric that is held taut in a "penetration unit", then the penetrator is allowed to drop so the end of the cylinder contacts the fabric sample. Sensors start a timer when the cylinder contacts the fabric and stop the timer when the cylinder passes through the fabric. The amount of time the heated cylinder is resting on the fabric is the measurement of the "thermal resistance" of the fabric to clinkers. A thermal resistance time of greater than 120 seconds is widely considered the best possible rating since the penetrator (or clinkers) will have sufficiently cooled after 120 seconds, thereby making it highly unlikely it would burn through the test material in greater than 120 seconds.

While the thermal resistance time is crucial, it has to also be viewed within the context of the weight of coating required to achieve a given thermal resistance time. Specifically, a low coating weight and a high thermal resistance time are most desirable.

Figure 7:
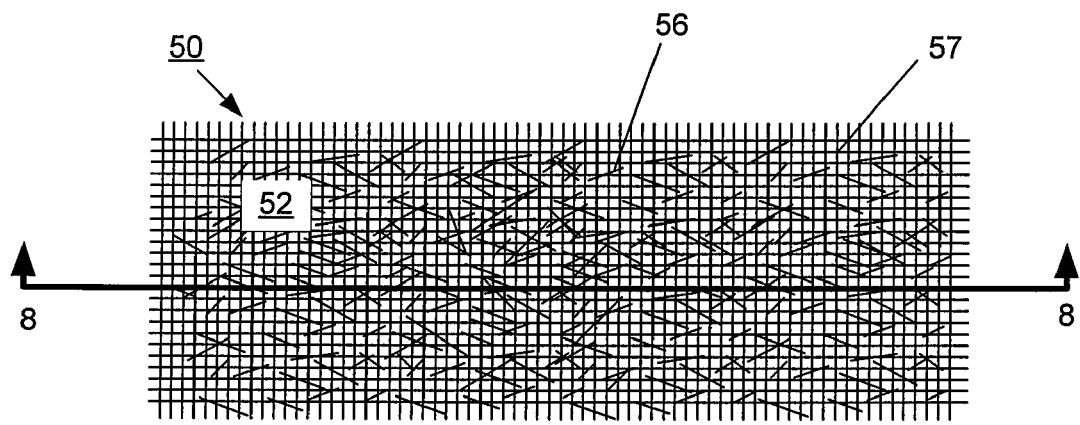
FIG. 7 is a schematic top view of a base fabric and coating with additive.
Figure 8:
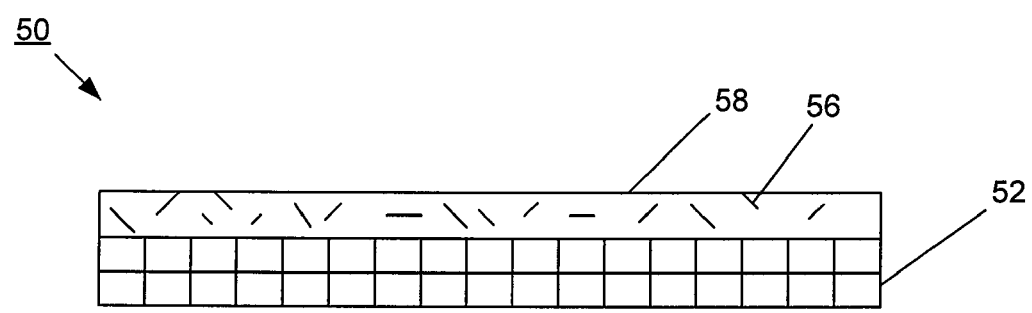
FIG. 8 is a cross sectional view of a base fabric and coating with additive, taken along line 8-8 of FIG. 7.

As shown in FIG. 5, heat shield 30 includes base fabric web 52 and coating 58 applied, at least, in a thin layer to the inward facing surface of heat shield 30. Fabric web 52 is preferably formed from synthetic fibers 57 (FIG. 7) between about 300 denier and about 900 denier. Unless otherwise noted, "about" as used herein, means within 5%. Preferably, fibers 57 are nylon, polyester, acrylic or a combination of some or all of those. Most preferably, the fibers are high tenacity nylon 66 available from Invista of Kingston, Ontario, Canada. Base fabric web 52 preferably weighs between about 4 and 8 ounces per square yard (osy). Preferably, about 1 to about 6 ounces of coating 58 are applied per square yard of fabric web 52, with about 2 ounces per square yard being most preferred. The orientation of coating 58 including additive 56 to fabric web 52 is generally shown in FIGS. 7 and 8.

Coating 58 is preferably elastomeric, with a polymeric silicone elastomer being more preferred, and a room temperature vulcanizing polymeric silicone elastomer, such as X832-394 available from Shin Etsu being most preferred.

Coating 58 imparts the best thermal resistance to base fabric, at the lowest coating weight, when compared to no coating or conventional coatings. This superior performance occurred at all tested temperatures. This data is reported in Table 1, and graphically represented at various temperatures in FIGS. 10-14.

TABLE 1

THERMAL RESISTANCE OF VARIOUS COATINGS AT VARIOUS AMOUNTS AT VARIOUS TEMPERATURES

| SAMPLE ID | TOTAL WEIGHT (osy) | GRIEGE OF FABRIC (osy) | TYPE OF COATING + ADDITIVE | TEST TEMP (Celsius) | COATING WEIGHT (osy) | THERMAL RESISTANCE (seconds) |
|---|---|---|---|---|---|---|
| 1 | 6.76 | 5.44 | SbO5 | 450 | 1.32 | 3.18 |
| 2 | 7.95 | 5.44 | SbO5 | 450 | 2.51 | 8.90 |
| 3 | 9.27 | 5.44 | SbO5 | 450 | 3.83 | 120.00 |

TABLE 1-continued

THERMAL RESISTANCE OF VARIOUS COATINGS AT VARIOUS AMOUNTS AT VARIOUS TEMPERATURES

| SAMPLE ID | TOTAL WEIGHT (osy) | GRIEGE OF FABRIC (osy) | TYPE OF COATING + ADDITIVE | TEST TEMP (Celsius) | COATING WEIGHT (osy) | THERMAL RESISTANCE (seconds) |
|---|---|---|---|---|---|---|
| 4 | 10.52 | 5.44 | SbO5 | 450 | 5.08 | 120.00 |
| 5 | 6.91 | 5.44 | Expandable graphite | 450 | 1.47 | 5.09 |
| 6 | 7.75 | 5.44 | Expandable graphite | 450 | 2.31 | 15.00 |
| 7 | 8.74 | 5.44 | Expandable graphite | 450 | 3.30 | 120.00 |
| 8 | 10.08 | 5.44 | Expandable graphite | 450 | 4.64 | 120.00 |
| 9 | 7.19 | 5.44 | LSR ONLY | 450 | 1.75 | 6.22 |
| 10 | 7.43 | 5.44 | LSR ONLY | 450 | 1.98 | 7.08 |
| 11 | 7.92 | 5.44 | LSR ONLY | 450 | 2.47 | 120.00 |
| 12 | 8.36 | 5.44 | LSR ONLY | 450 | 2.90 | 120.00 |
| 13 | 8.80 | 5.44 | LSR ONLY | 450 | 3.34 | 120.00 |
| 14 | 9.52 | 5.44 | LSR ONLY | 450 | 4.07 | 120.00 |
| 15 | 6.83 | 5.44 | 20% SLAG | 450 | 1.39 | 4.63 |
| 16 | 7.13 | 5.44 | 20% SLAG | 450 | 1.69 | 7.77 |
| 17 | 7.43 | 5.44 | 20% SLAG | 450 | 1.99 | 54.97 |
| 18 | 7.70 | 5.44 | 20% SLAG | 450 | 2.26 | 120.00 |
| 19 | 8.13 | 5.44 | 20% SLAG | 450 | 2.69 | 120.00 |
| 20 | 8.77 | 5.44 | 20% SLAG | 450 | 3.33 | 120.00 |
| 21 | 9.67 | 5.44 | 20% SLAG | 450 | 4.23 | 120.00 |
| 22 | 6.73 | 5.44 | SbO5 | 550 | 1.29 | 1.14 |
| 23 | 8.18 | 5.44 | SbO5 | 550 | 2.74 | 5.13 |
| 24 | 9.19 | 5.44 | SbO5 | 550 | 3.75 | 8.13 |
| 25 | 10.40 | 5.44 | SbO5 | 550 | 4.96 | 6.28 |
| 26 | 6.86 | 5.44 | Expandable graphite | 550 | 1.42 | 3.06 |
| 27 | 7.66 | 5.44 | Expandable graphite | 550 | 2.26 | 6.09 |
| 28 | 8.73 | 5.44 | Expandable graphite | 550 | 3.29 | 10.63 |
| 29 | 9.99 | 5.44 | Expandable graphite | 550 | 4.55 | 22.60 |
| 30 | 6.91 | 5.44 | LSR ONLY | 550 | 1.47 | 2.30 |
| 31 | 7.19 | 5.44 | LSR ONLY | 550 | 1.75 | 2.81 |
| 32 | 7.43 | 5.44 | LSR ONLY | 550 | 1.99 | 3.08 |
| 33 | 7.92 | 5.44 | LSR ONLY | 550 | 2.48 | 4.95 |
| 34 | 8.36 | 5.44 | LSR ONLY | 550 | 2.92 | 8.57 |
| 35 | 8.80 | 5.44 | LSR ONLY | 550 | 3.36 | 28.83 |
| 36 | 9.52 | 5.44 | LSR ONLY | 550 | 4.08 | 108.03 |
| 37 | 6.83 | 5.44 | 20% SLAG | 550 | 1.39 | 2.21 |
| 38 | 7.17 | 5.44 | 20% SLAG | 550 | 1.73 | 2.71 |
| 39 | 7.50 | 5.44 | 20% SLAG | 550 | 2.06 | 4.48 |
| 40 | 7.73 | 5.44 | 20% SLAG | 550 | 2.29 | 4.97 |
| 41 | 8.20 | 5.44 | 20% SLAG | 550 | 2.76 | 47.77 |
| 42 | 8.80 | 5.44 | 20% SLAG | 550 | 3.36 | 120.00 |
| 43 | 9.77 | 5.44 | 20% SLAG | 550 | 4.33 | 120.00 |
| 44 | 6.77 | 5.44 | SbO5 | 650 | 1.33 | 1.41 |
| 45 | 8.15 | 5.44 | SbO5 | 650 | 2.71 | 2.69 |
| 46 | 9.06 | 5.44 | SbO5 | 650 | 3.62 | 3.89 |
| 47 | 10.50 | 5.44 | SbO5 | 650 | 5.06 | 6.78 |
| 48 | 6.47 | 5.44 | Expandable graphite | 650 | 1.03 | 1.58 |
| 49 | 7.66 | 5.44 | Expandable graphite | 650 | 2.22 | 3.30 |
| 50 | 8.59 | 5.44 | Expandable graphite | 650 | 3.15 | 4.51 |
| 51 | 10.03 | 5.44 | Expandable graphite | 650 | 4.59 | 7.41 |
| 52 | 6.91 | 5.44 | LSR ONLY | 650 | 1.47 | 1.39 |
| 53 | 7.19 | 5.44 | LSR ONLY | 650 | 1.75 | 3.12 |
| 54 | 7.43 | 5.44 | LSR ONLY | 650 | 1.99 | 2.03 |
| 55 | 7.92 | 5.44 | LSR ONLY | 650 | 2.48 | 2.73 |
| 56 | 8.36 | 5.44 | LSR ONLY | 650 | 2.92 | 4.26 |
| 57 | 8.80 | 5.44 | LSR ONLY | 650 | 3.36 | 3.82 |

TABLE 1-continued

THERMAL RESISTANCE OF VARIOUS COATINGS AT
VARIOUS AMOUNTS AT VARIOUS TEMPERATURES

| SAMPLE ID | TOTAL WEIGHT (osy) | GRIEGE OF FABRIC (osy) | TYPE OF COATING + ADDITIVE | TEST TEMP (Celsius) | COATING WEIGHT (osy) | THERMAL RESISTANCE (seconds) |
|---|---|---|---|---|---|---|
| 58 | 9.52 | 5.44 | LSR ONLY | 650 | 4.08 | 5.32 |
| 59 | 6.93 | 5.44 | 20% SLAG | 650 | 1.49 | 1.41 |
| 60 | 7.17 | 5.44 | 20% SLAG | 650 | 1.73 | 1.30 |
| 61 | 7.50 | 5.44 | 20% SLAG | 650 | 2.06 | 2.16 |
| 62 | 7.73 | 5.44 | 20% SLAG | 650 | 2.29 | 2.44 |
| 63 | 8.13 | 5.44 | 20% SLAG | 650 | 2.69 | 4.83 |
| 64 | 8.63 | 5.44 | 20% SLAG | 650 | 3.19 | 52.70 |
| 65 | 9.77 | 5.44 | 20% SLAG | 650 | 4.33 | 120.00 |
| 66 | 6.91 | 5.44 | LSR ONLY | 750 | 1.47 | 1.42 |
| 67 | 6.77 | 5.44 | SbO5 | 750 | 1.33 | 1.41 |
| 68 | 7.40 | 5.44 | SbO5 | 750 | 1.96 | 1.30 |
| 69 | 9.19 | 5.44 | SbO5 | 750 | 3.75 | 2.18 |
| 70 | 10.40 | 5.44 | SbO5 | 750 | 4.96 | 3.12 |
| 71 | 6.47 | 5.44 | Expandable graphite | 750 | 1.03 | 1.58 |
| 72 | 6.59 | 5.44 | Expandable graphite | 750 | 1.15 | 2.26 |
| 73 | 8.73 | 5.44 | Expandable graphite | 750 | 3.29 | 4.05 |
| 74 | 9.99 | 5.44 | Expandable graphite | 750 | 4.55 | 4.50 |
| 75 | 7.19 | 5.44 | LSR ONLY | 750 | 1.75 | 1.49 |
| 76 | 7.43 | 5.44 | LSR ONLY | 750 | 1.99 | 1.85 |
| 77 | 7.92 | 5.44 | LSR ONLY | 750 | 2.48 | 2.08 |
| 78 | 8.36 | 5.44 | LSR ONLY | 750 | 2.92 | 2.27 |
| 79 | 8.80 | 5.44 | LSR ONLY | 750 | 3.36 | 2.75 |
| 80 | 9.52 | 5.44 | LSR ONLY | 750 | 4.08 | 4.79 |
| 81 | 6.87 | 5.44 | 20% SLAG | 750 | 1.43 | 1.27 |
| 82 | 7.10 | 5.44 | 20% SLAG | 750 | 1.66 | 1.41 |
| 83 | 7.40 | 5.44 | 20% SLAG | 750 | 1.96 | 2.31 |
| 84 | 7.70 | 5.44 | 20% SLAG | 750 | 2.26 | 1.96 |
| 85 | 8.07 | 5.44 | 20% SLAG | 750 | 2.63 | 2.65 |
| 86 | 8.73 | 5.44 | 20% SLAG | 750 | 3.29 | 15.25 |
| 87 | 9.77 | 5.44 | 20% SLAG | 750 | 4.33 | 83.33 |
| 88 | 9.28 | 5.80 | LSR ONLY | 1000 | 3.48 | 1.88 |
| 89 | 7.00 | 5.80 | 20% SLAG | 1000 | 1.20 | 1.00 |
| 90 | 7.90 | 5.80 | 20% SLAG | 1000 | 2.10 | 1.30 |
| 91 | 8.60 | 5.80 | 20% SLAG | 1000 | 2.80 | 1.80 |
| 92 | 10.00 | 5.80 | 20% SLAG | 1000 | 4.20 | 60.00 |

Some of the data in Table 1 (and FIGS. 10-14) represent the average of several measurements, but are presented as one sample for simplicity.

Figure 10:
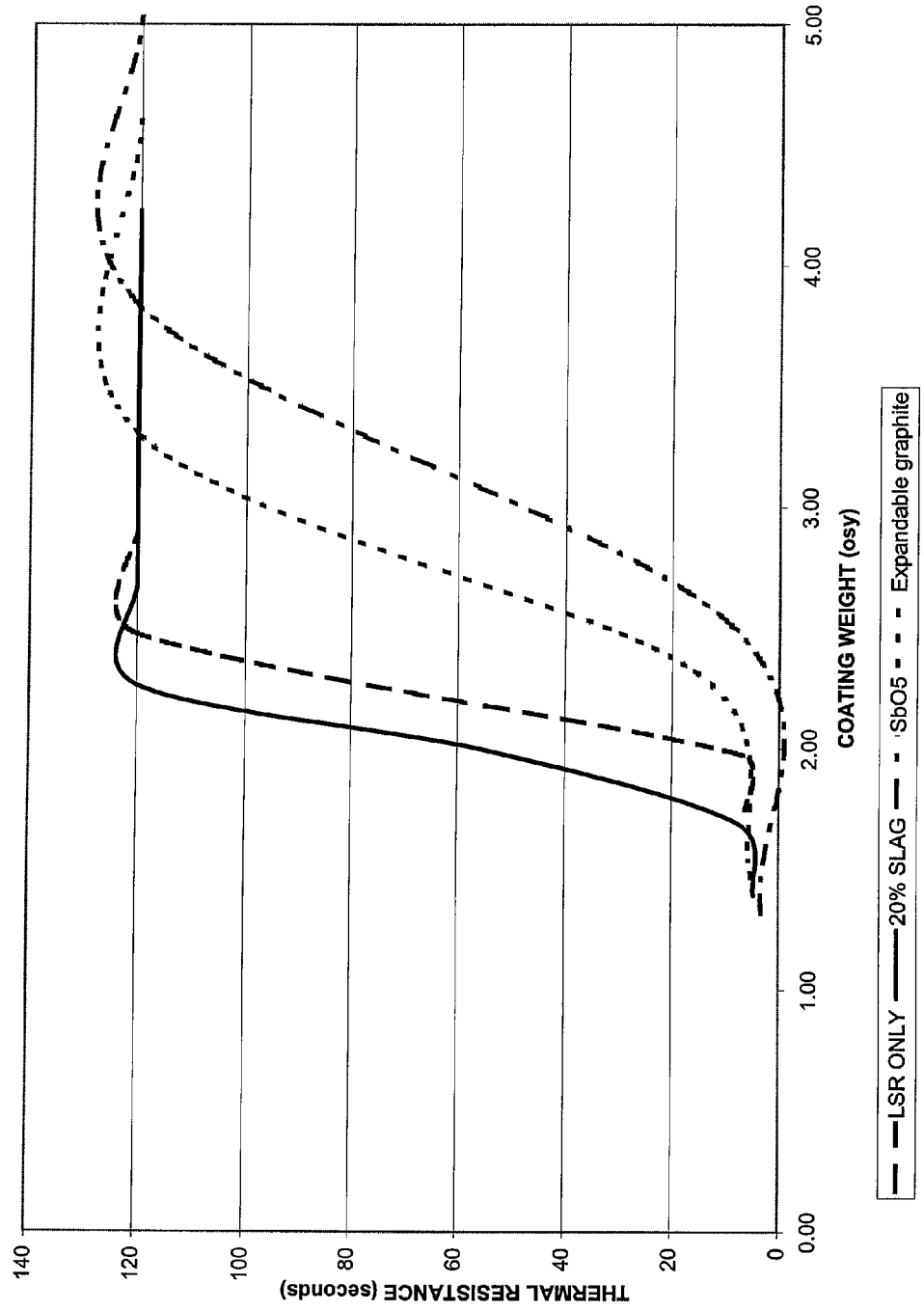
FIG. 10 graphically represents the thermal resistance profiles of various coatings tested at 450° C.
Figure 11:
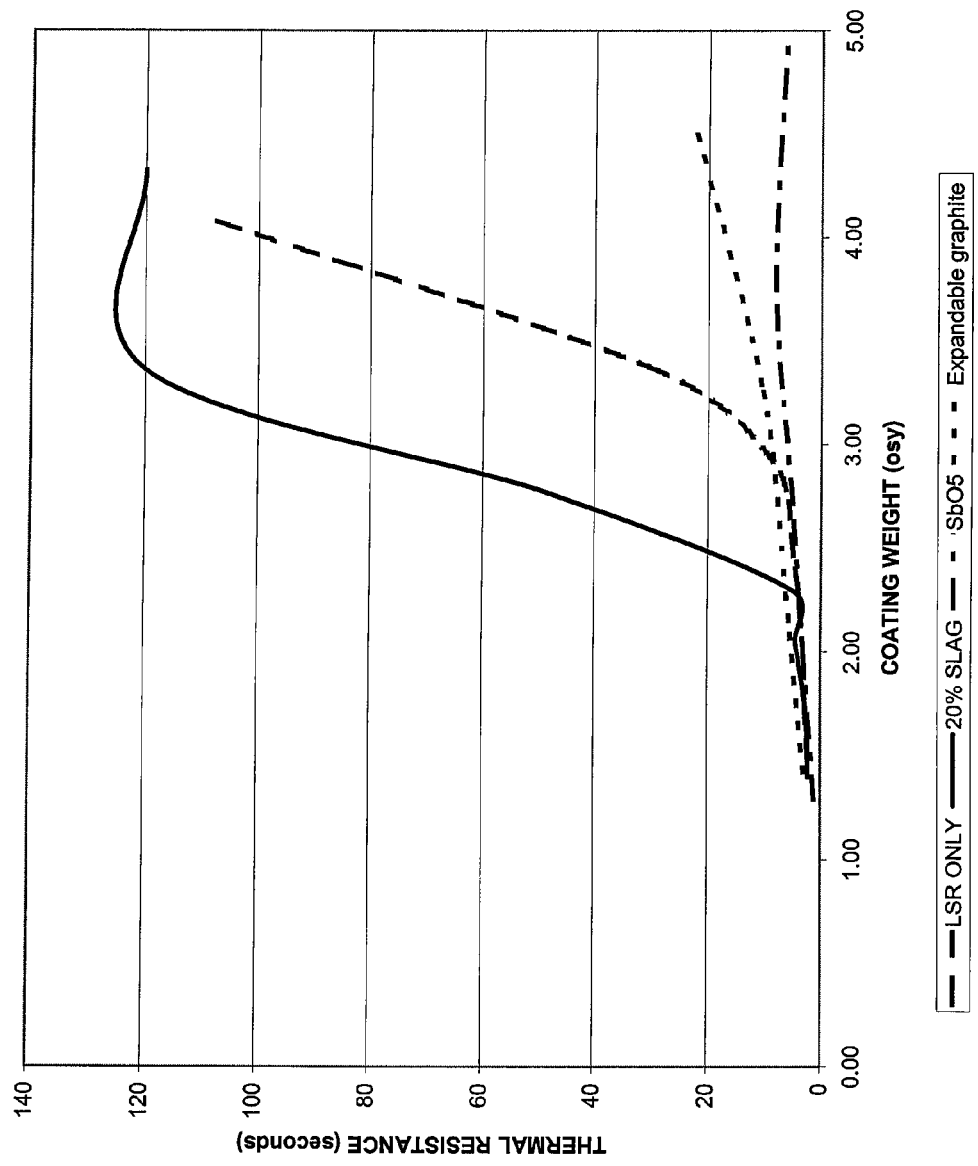
FIG. 11 graphically represents the thermal resistance profiles of various coatings tested at 550° C.
Figure 12:
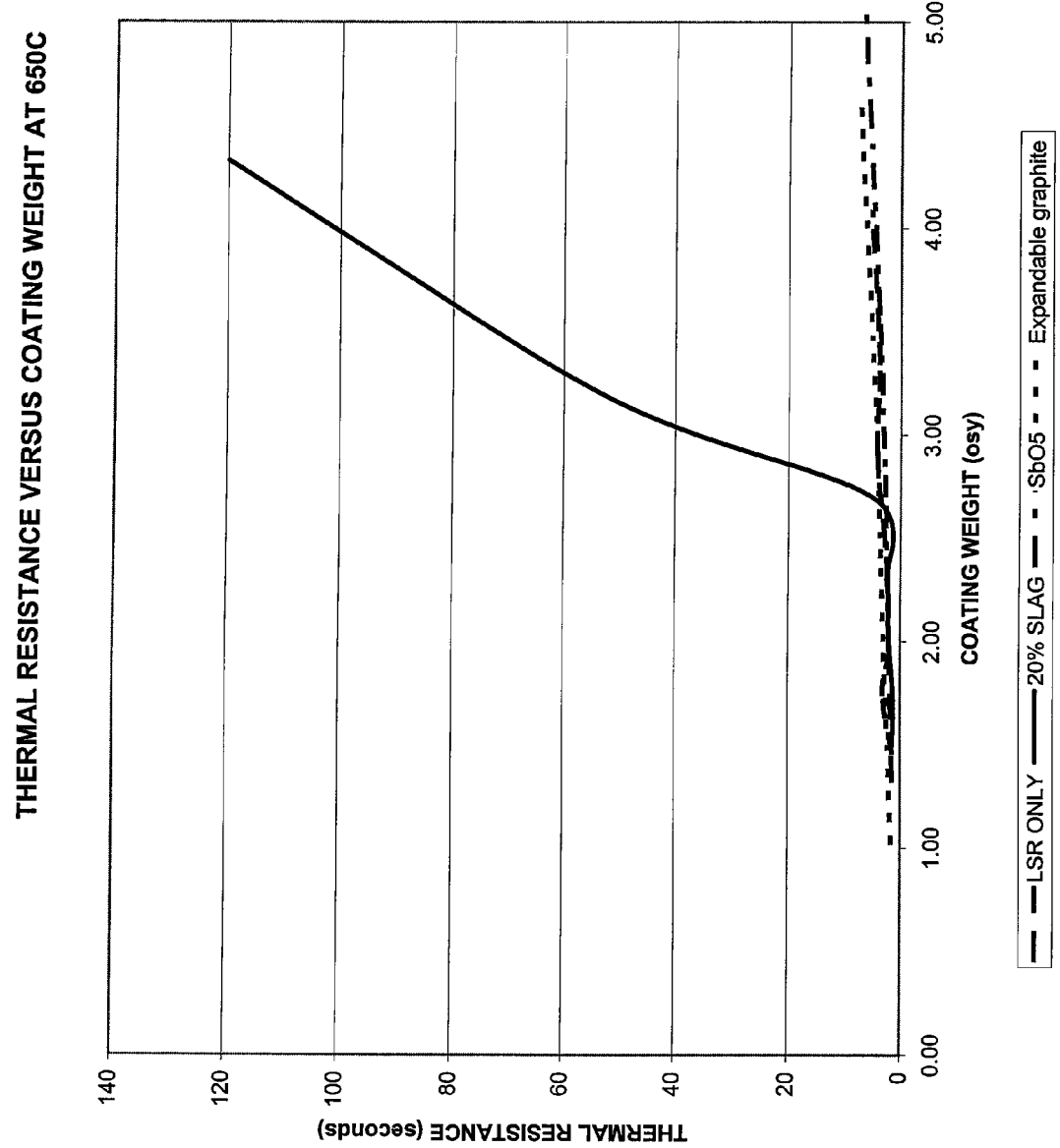
FIG. 12 graphically represents the thermal resistance profiles of various coatings tested at 650° C.
Figure 13:
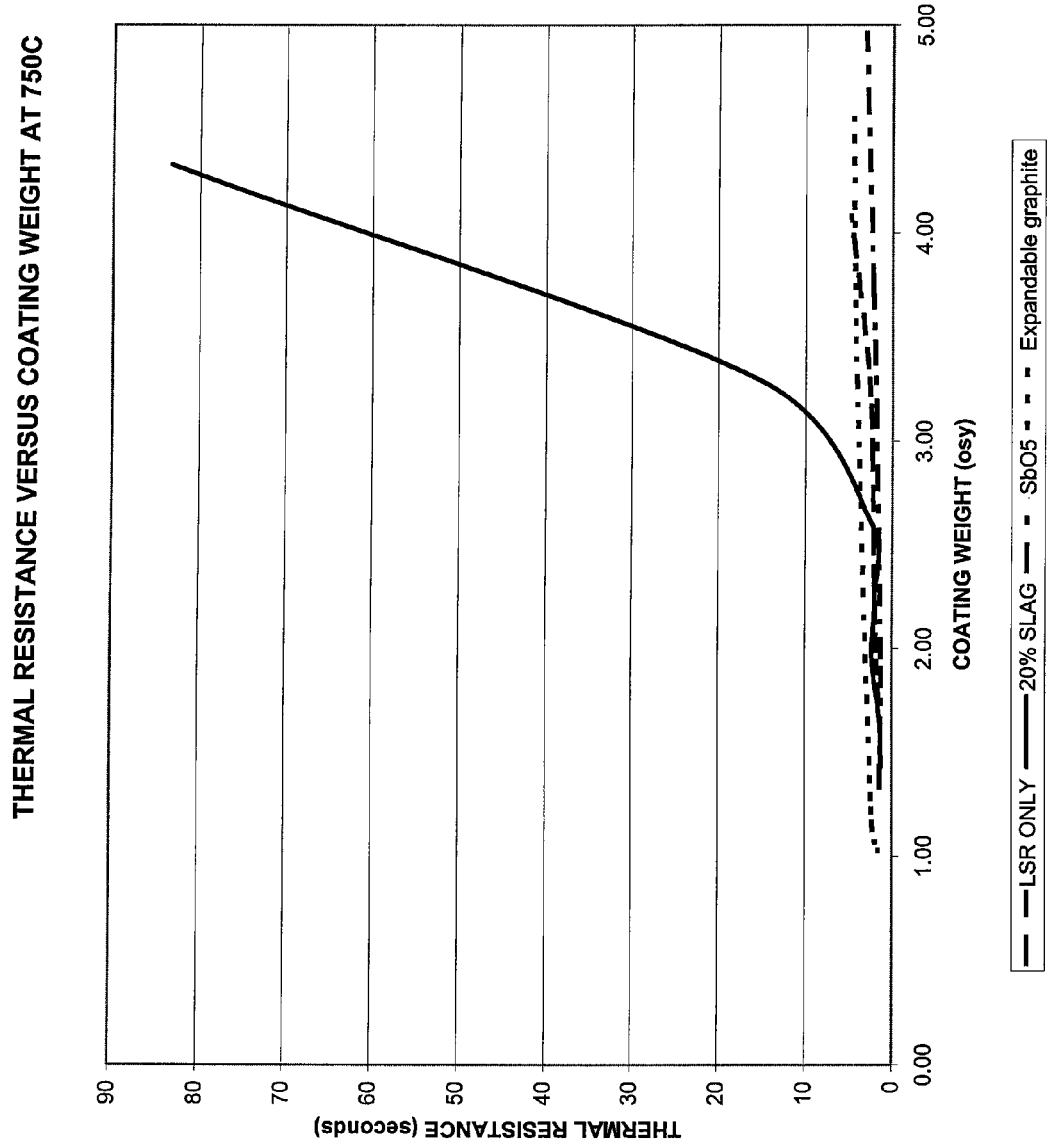
FIG. 13 graphically represents the thermal resistance profiles of various coatings tested at 750° C.
Figure 14:
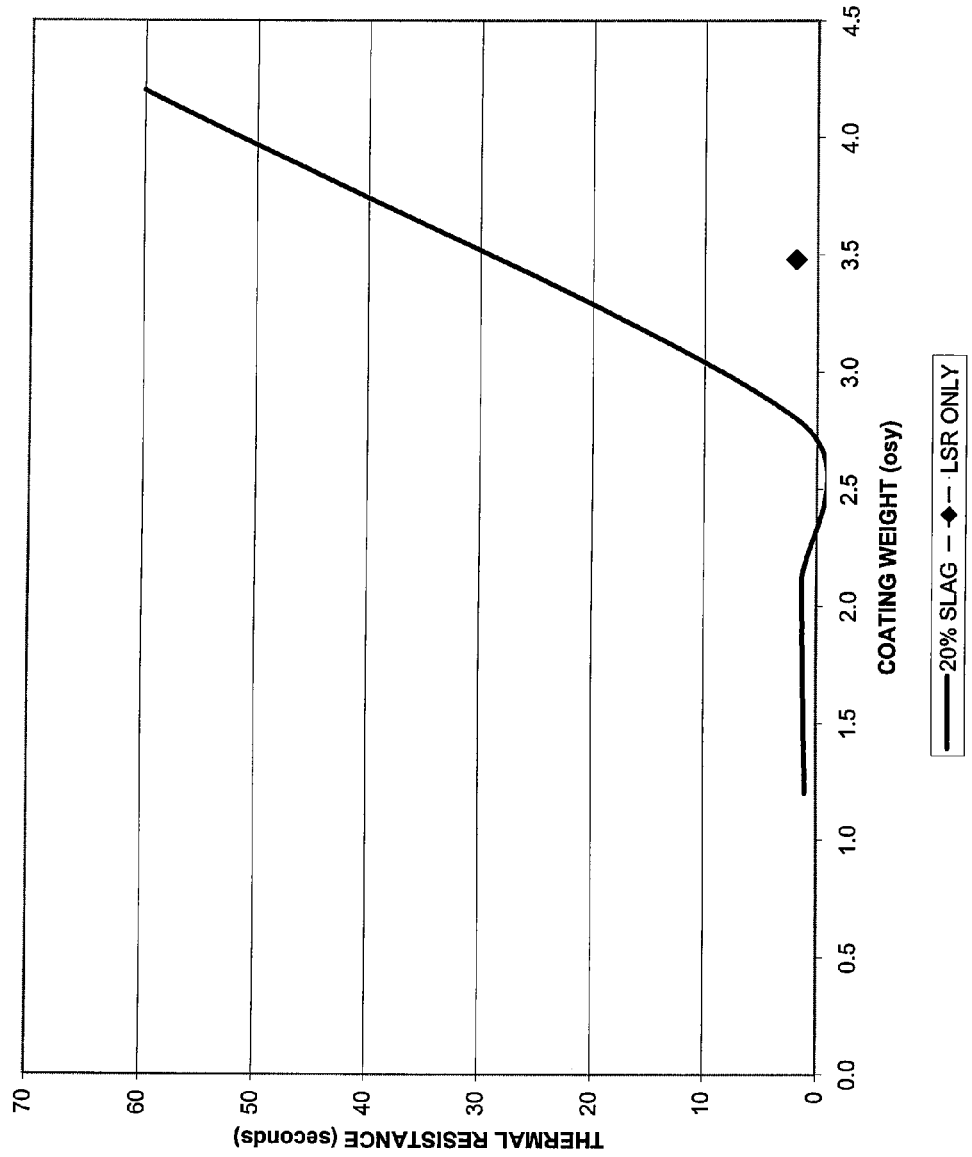
FIG. 14 graphically represents the thermal resistance profiles of one embodiment at 1000° C.

Referring now to FIG. 10, it is clear that "20% Slag" samples provide superior performance (higher thermal resistance at a lower coating weight) to the other samples tested at 450° C. "20% Slag" samples are an embodiment of the present inventions, which are specifically 420 denier, 46×46 ends per inch, high tenacity nylon fabric coated with liquid silicon rubber that contain 20% by weight of the vitreous-slag fiber. All samples were tested using standard production airbag fabric style 3209803 fabric available from Highland Industries. Likewise, FIG. 11 indicates superior performance of "20% Slag" samples versus other samples at 550° C. While the superior performance at 450 and 550° C. is remarkable, it was very unexpected that the coating would also impart thermal resistance at 650, 750 and 1000° C. As indicated in FIGS. 12-14, only the 20% slag sample provides meaningful thermal resistance time.

Thermal resistance at 450° C. is important because within a driver's side airbag, the sodium azide propellant upon detonation will decompose at 300° C. to produce the inflation (nitrogen) gas. Adding in an additional safety factor, 450 C is a suitable minimal operating temperature requirement, and a minimal temperature for which clinkers could develop. Thermal resistance at 650° C. and higher is important because faster deploying airbags are necessary to accommodate shorter inflation times. This necessitates the need for higher output reactions and as such higher temperature clinkers will exist.

Coating 58 includes between about 10% to 20% high aspect ratio additive 56 by weight, with about 20% by weight being most preferred. Used herein, "high aspect ratio" shall refer to:

$W_A/H_A \geq 40$, where $W_A$ is the average of the longer dimension, and $H_A$ is the average of the shorter dimension of the particles.

Preferably, additive 56 includes a plurality of particulates of inorganic materials, and preferably those particulates are vitreous fibers, rods, flakes, ovals or combinations of some or all of those. Preferably, particulates include silicon oxides, hydrated alumina, and metallic oxides. It is also preferred that particles of additive 56 have an average surface area of between about 0.5 and about 1.0 meters squared per gram, an average length of between about 160 and about 240 microns, and an average width of between about 1 and 20 microns. The most preferred additive 56 is PFM® Fiber 204 available from Sloss Industries Corporation of Birmingham, Ala.

Based on the data, it is believed that the marked improvement in burn through rate is attributable to using a high aspect ratio thermally resistant additive, such as additive 56, as opposed to merely the thermal resistance of the additive itself. See Table 2 below:

TABLE 2

THERMAL RESISTANCE AS A FUNCTION OF ASPECT RATIO

| SAMPLE | | ASPECT | Specific surface | THERMAL RESISTANCE (seconds) USING ADDITIVE IN COATING AT 3.00 OSY | | | |
|---|---|---|---|---|---|---|---|
| ID | ADDITIVE | RATIO | Area (SSA) | @450 C. | @550 C. | @650 C. | @750 C. |
| 20, 42, 64, 86 | PMF204 | 40 | .73 | 120 | 120 | 52.7 | 15.25 |
| 3, 24, 46, 69 | SbO5 | 8 | .01 | 120 | 8.13 | 3.89 | 2.18 |
| 7, 28, 50, 73 | Expandable graphite | 1 | 4.27 | 120 | 10.63 | 4.51 | 4.05 |
| 13, 35, 57, 79 | LSR only | N/A | N/A | 120 | 28.83 | 3.82 | 2.75 |

Figure 9:
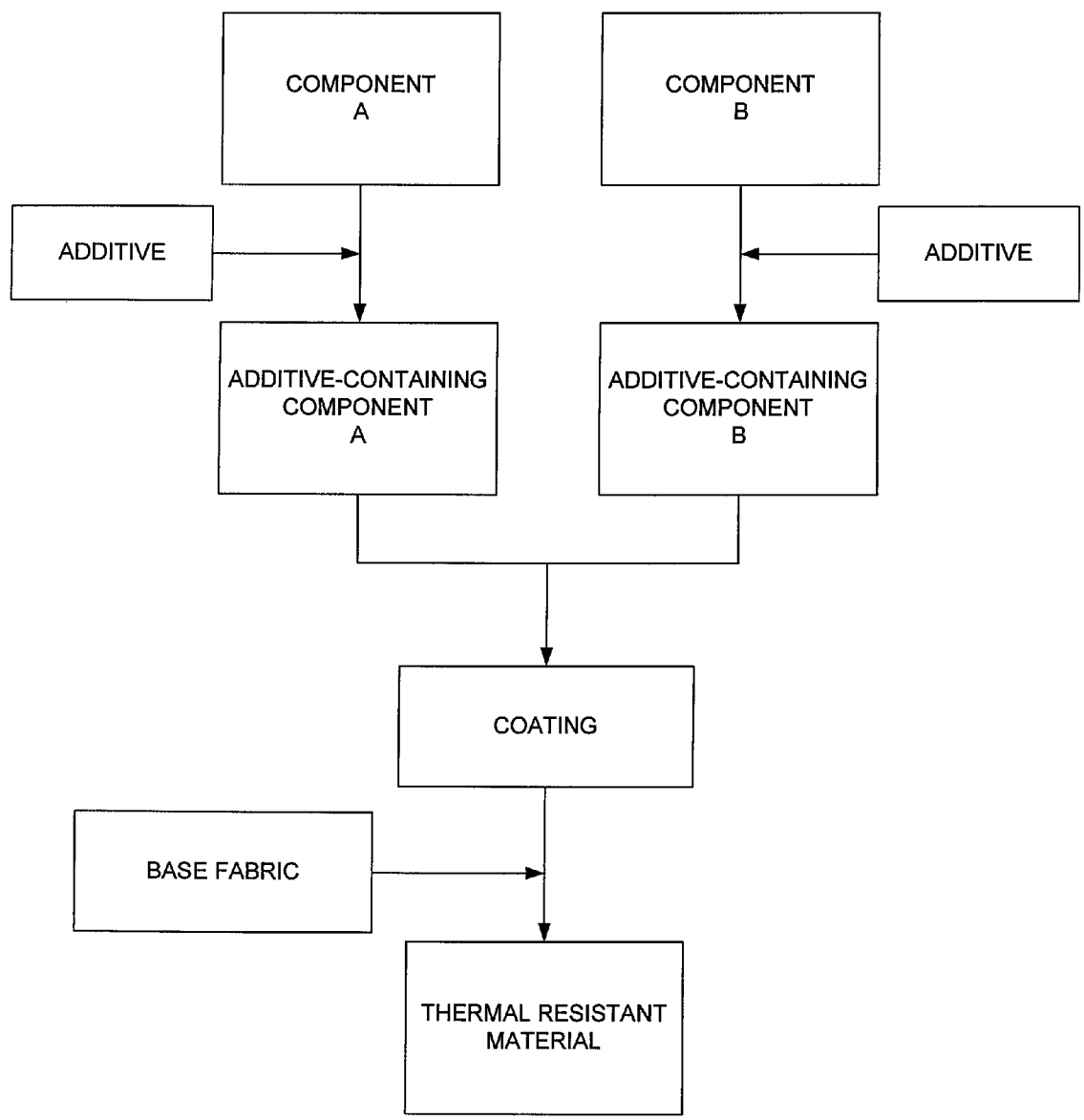
FIG. 9 diagrams some major steps of making a thermal resistant material.

As one skilled in the art would appreciate, combining an additive with a coating is a problematic endeavor considering the propensity of additive-containing formulations to become overly viscous, and therefore not be usable in a coating machine. Here, the coating viscosity problem was overcome by first splitting additive 56 between the individual components of the coating and then combining those components to make the coating. Specifically, referring to FIG. 9, additive (56) is combined with Component A, and additive (56) is separately combined with Component B, the Components A and B, each containing additive 56, are combined to form coating 58. Coating 58 is applied to base fabric web 52 to form thermal resistant material (50).

Preferably, the step of combining additive 56 includes the step of adding a vitreous fiber, most preferably contain silicon oxides, aluminum hydrate, and metallic oxides. Preferably, additive 56 is added to Components A and B at approximately 10% to approximately 20% by weight total. Preferably, Component A is either silicone fluid or reactant. Preferably, the step of applying coating 58 to base fabric web 52 includes the step of applying coating 58 whose viscosity is between approximately 15,000 and 70,000 centipoises. Preferably, base fabric web 52 is nylon, polyester, acrylic, or combinations including some or all of those, with high tenacity nylon 66 being the most preferred. Preferably, 4 ounces of coating 58 are applied per square yard of base fabric web 52. Preferably, the step of applying coating includes the step of applying a polymeric silicone elastomer, with room temperature vulcanizing polymeric silicone elastomer being most preferred. Coating can be accomplished by blade coating, knife over air coating, slot die coating, knife over belt coating, reverse roll coating or another method known in the art.

Samples set forth in this application contain the following components (ingredients), obtained from the following sources:

TABLE 3

COMPONENTS AND SOURCES

| COMPONENT | MANUFACTURER'S DESIGNATION | SOURCE |
|---|---|---|
| Fabric | 3209803 | Highland Industries |
| LSR | X832-394 | Shin Etsu |
| Slag | PMF 204 | Sloss Industries |
| SbO5 | Burnex A1582 | Nyacol Nano Technologies |
| Expandable Graphite | Nyagraph 35S | Nyacol Nano Technologies |

In use, thermal resistant material 50 is formed by coating base fabric web 52 with coating 58 including additive 56. The thermal resistant material 50 is then formed into heat shield 30, and attachment plates 34 with fasteners 36 are connected. Heat shield 30 is placed within air bag 20 so inlets 42 of heat shield 30 and airbag 20 are aligned, then fasteners 36 of attachment plates 34 are put through shield fastener openings 32 and bag fastener openings 22, and then secured with, for example, a conventional nut. Inflator 15 is connected to inlet 42, and the airbag/heat shield/attachment plate/inflator assembly is put behind cover 12.

The relationship between aspect ratio of the additive and thermal resistivity was not expected. Rather, it was expected that the thermal properties alone of the additive would control the burn-through rate of the resulting coating and that the physical properties of the additive would have little effect or interaction with the thermal properties of the additive.

It was also unexpected that slag would be a suitable additive in a textile coating given slag's sand-like physical properties, which would be expected to create an abrasive product and likely erode durability of the end product.

Another unexpected result of the present inventions is that it is even possible to combine the additive in such a high concentration amount without creating an undesirably viscous coating. Specifically, the effect of combining particulates with a liquid is well known to increase viscosity, and those skilled in the art know that overly viscous coatings do not lend themselves to use in standard equipment and applications.

Yet another unexpected result was that long thin rods would be amenable to use in a coating given their affinity for a birefringent orientation in standard coating machines, which would be expected to make uniform distribution difficult to achieve.

However, in spite of the aforementioned hurdles, the present inventions were able to employ nonconventional components with particular characteristics while, at the same time, overcome the viscosity problems to formulate a coating with exceptionally good thermal resistance times.

Certain modifications and improvements will occur to those skilled in the art upon a reading of the foregoing description. By way of example, thermal resistant material 50 may be used to form both airbag 20 and heat shield 30. Also, thermal resistant material 50 could be used in a variety of other items, including personal thermal protection garments. Moreover, items like, welding blankets, spatter shields, fires sleeves, automotive firewall, wildland fire shelter, turnout gear, cargo covers, structurally reinforced and thermally resistant thermoplastic coatings, could be manufactured in similar detail. Additionally, higher levels of protection can be achieved through coating both the face and back of a substrate. It should be understood that all such modifications and improvements have been deleted herein for the sake of conciseness and readability but are properly within the scope of the following claims.

We claim:

1. A vehicle safety device comprising:
   (a) an air bag; and
   (b) a heat shield located within said air bag, said heat shield including a high aspect ratio thermally resistant additive, said additive including particulates having longer dimensions and shorter dimensions, with the ratio of the average length of the longer dimension to the average length of the shorter dimension being equal to or greater than 40, with said average longer dimension being between about 160 microns and 240 microns, and said average shorter dimension being between about 1 micron and 20 microns whereby said heat shield has a thermal resistance value of greater than 120 seconds at 450° C.

2. The vehicle safety device of claim 1 further including an inflator in fluid communication with said air bag and said heat shield.

3. The vehicle safety device of claim 2 further including a cover partially enclosing said air bag and said heat shield.

4. The vehicle safety device of claim 2 further including an attachment plate connecting said air bag and said heat shield.

5. The vehicle safety device of claim 1 wherein said heat shield has a thermal resistance value of greater than 120 seconds at 550° C.

6. The vehicle safety device of claim 1 wherein said heat shield has a thermal resistance value of greater than 120 seconds at 650° C.

7. The vehicle safety device of claim 1 wherein said heat shield has a thermal resistance value of greater than 60 seconds at 750° C.

8. A heat shield for an air bag vehicle safety device comprising:
   (a) a base fabric web; and
   (b) a coating including a high aspect ratio thermally resistant additive, said additive including particulates having longer dimensions and shorter dimensions, with the ratio of the average length of the longer dimension to the average length of the shorter dimension being equal to or greater than 40, with said average longer dimension being between about 160 microns and 240 microns, and said average shorter dimension being between about 1 micron and 20 microns whereby said coating includes between about 10 wt. % and less than 20 wt. % of said high aspect ratio additive.

9. The device according to claim 8, wherein said base fabric web is formed from synthetic fibers.

10. The device according to claim 9, wherein said synthetic fibers forming said base fabric web are between about 300 denier and about 900 denier.

11. The device according to claim 9, wherein said synthetic fibers are selected from the group consisting of nylon, polyester, acrylic, nylon/polyester blends, nylon/acrylic blends and polyester/acrylic blends and combinations thereof.

12. The device according to claim 11, wherein said synthetic fibers are a high tenacity nylon 66.

13. The device according to claim 8, wherein said base fabric web weighs between about 4 oz/yd$^2$ and about 8 oz/yd$^2$.

14. The device according to claim 8, wherein said base fabric web is a woven construction.

15. The device according to claim 14, wherein said base fabric web is a 1×1 plain weave construction.

16. The device according to claim 8, wherein said device includes between about 1 oz/yd$^2$ and about 6 oz/yd$^2$ of coating on said base fabric web.

17. The device according to claim 16, wherein said device includes about 4 oz/yd$^2$ of coating on said base fabric web.

18. The device according to claim 8, wherein said coating is an elastomer.

19. The device according to claim 18, wherein said coating includes a polymeric silicone elastomer.

20. The device according to claim 19, wherein said polymeric silicone elastomer is a room temperature vulcanizing polymeric silicone elastomer.

21. The device according to claim 8, wherein said coating includes about 15 wt. % of said high aspect ratio additive.

22. The device according to claim 8, wherein said high aspect ratio additive includes a plurality of particulate materials.

23. The device according to claim 22, wherein said plurality of particulate materials are substantially inorganic materials.

24. The device according to claim 23, wherein said substantially inorganic materials include silicon oxides, aluminum hydrates, and metallic oxides.

25. The device according to claim 22, wherein said plurality of particulate materials generally have a shape selected from the group consisting of fibers, rods, flakes, ovals and mixtures thereof.

26. The device according to claim 25, wherein said plurality of particulates are fibers.

27. The device according to claim 8, wherein said high aspect ratio additive has a specific surface area per volume of between about 0.2 m$^{-1}$ and about 4 m$^{-1}$.

28. The device according to claim 8, wherein said high aspect ratio additive has a specific surface area per mass of between about 0.5 m$^2$/g and 1.0 m$^2$/g.

29. The device according to claim 8, wherein the viscosity prior to being applied of said coating including a high aspect ratio thermally resistant additive is between about 15,000 centipoises and about 70,000 centipoises.

30. The device according to claim 29, wherein the viscosity prior to being applied of said coating including a high aspect ratio thermally resistant additive is about 60,000 centipoises.

31. A vehicle safety device comprising:
   (a) an air bag;
   (b) a heat shield located within said air bag, said heat shield including a base fabric web and a coating including a high aspect ratio thermally resistant additive, said additive including particulates having longer dimensions and shorter dimensions, with the ratio of the average length of the longer dimension to the average length of the shorter dimension being equal to or greater than 40, with said average longer dimension being between about 160 microns and 240 microns, and said average shorter dimension being between about 1 micron and 20 microns, and said heat shield having a thermal resistance value of greater than 120 seconds at 450° C.; and
   (c) an inflator in fluid communication with said air bag and said heat shield.

32. The vehicle safety device of claim 31 wherein said heat shield has a thermal resistance value of greater than 120 seconds at 550° C.

33. The vehicle safety device of claim 31 wherein said heat shield has a thermal resistance value of greater than 120 seconds at 650° C.

34. The vehicle safety device of claim 31 wherein said heat shield has a thermal resistance value of greater than 60 seconds at 750° C.

* * * * *